United States Patent [19]

Okura

[11] Patent Number: 4,668,870
[45] Date of Patent: May 26, 1987

[54] REFRIGERANT LEVEL SENSOR IN RECEIVER TANK

[75] Inventor: Eiji Okura, Konan, Japan

[73] Assignee: Diesel Kiki Co., Ltd., Tokyo, Japan

[21] Appl. No.: 623,765

[22] Filed: Jun. 20, 1984

[30] Foreign Application Priority Data

Jul. 2, 1983 [JP] Japan .................... 58-103247[U]

[51] Int. Cl.$^4$ ............................................ G01N 21/49
[52] U.S. Cl. .................................. 250/577; 356/436
[58] Field of Search ................. 250/211, 577; 356/436

[56] References Cited

U.S. PATENT DOCUMENTS 4,045,668 8/1977 Pitt et al. ............................ 250/577
4,410,020 10/1983 Lorenz ............................... 250/577
4,468,567 8/1984 Sasano et al. ...................... 250/577

Primary Examiner—Gene Wan
Attorney, Agent, or Firm—Wenderoth, Lind & Ponack

[57] ABSTRACT

A device for sensing the refrigerant level in a receiver tank and thereby detecting the surplus or shortage of the refrigerant in the tank is provided. The sensor device has a photoconductor a part of which is placed in the receiver tank. A light source is disposed at one end of the photoconductor and a light receptor element is disposed at the other end. The quantity of light passed from the light source to the receptor element through the photoconductor is changed as the photoconductor is dipped in the refrigerant in the tank. The surplus or shortage of the refrigerant in the tank is detected from the change in quantity of light received by the receptor element.

8 Claims, 3 Drawing Figures

U.S. Patent    May 26, 1987    4,668,870
FIG. 1
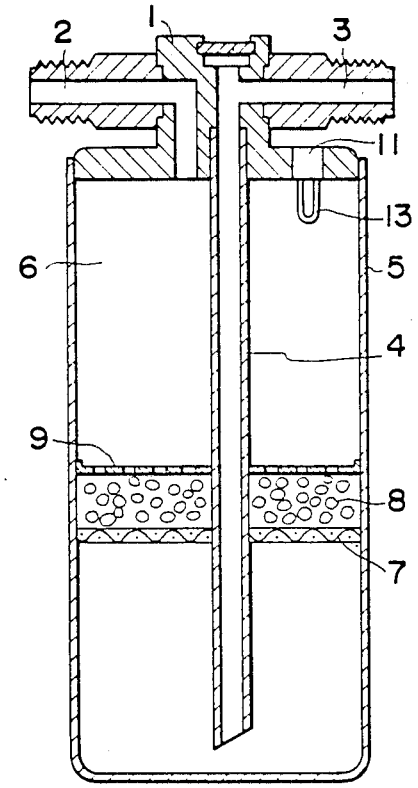
FIG. 3
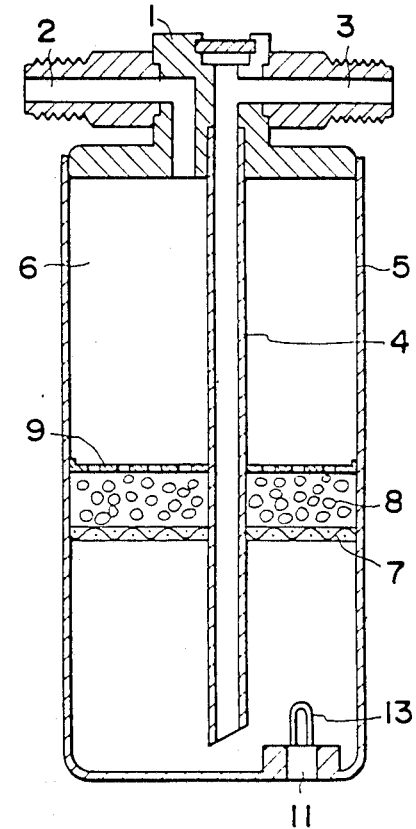
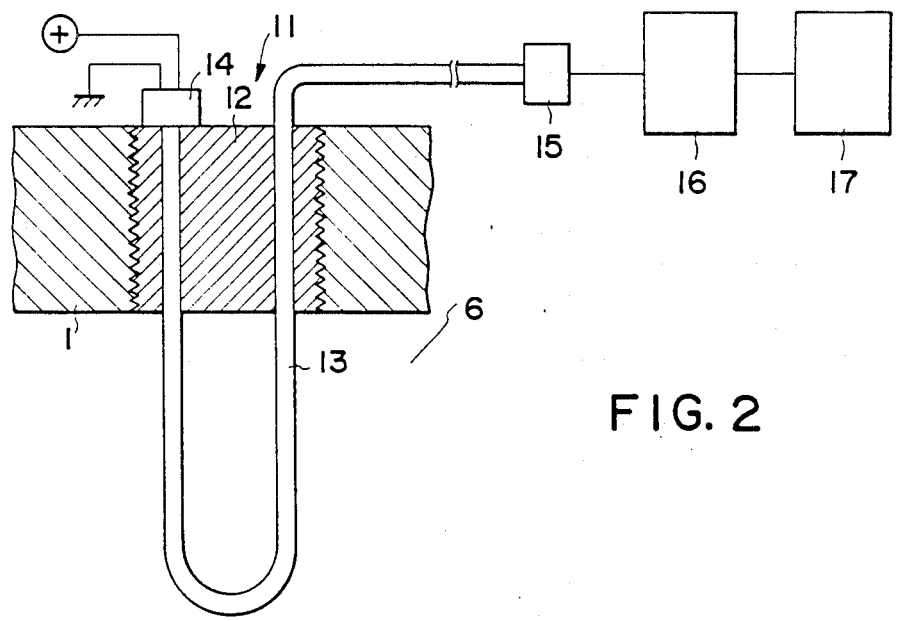
FIG. 2

4,668,870

REFRIGERANT LEVEL SENSOR IN RECEIVER TANK

FIELD OF THE INVENTION

This invention relates to a device for detecting the refrigerant level in a receiver tank to indicate the surplus or shortage of the refrigerant in the tank.

BACKGROUND OF THE INVENTION

Generally, the proper amount of refrigerant to be retained in a cooling system is specified according to the cooling system employed, and any shortage or overcharge of the refrigerant leads to a reduced cooling performance of the system. To avoid such shortage or overcharge of the refrigerant, various devices for detecting the amount of refrigerant have been developed, and a typical example of such prior art devices is disclosed in Japanese Utility Model Application No. 130175/80. This prior art device comprises a magnet-mounted float, a guide member adapted to guide said float and a lead switch housed in said guide member for detecting the ascent or descent of said float. In such a device, however, since the float is made of a lightweight material such as a foamed resin because the float must be kept floating in refrigerant having a small specific gravity, there have been the problems regarding the structural strength of the device and the accuracy of float movement in accordance with the change of refrigerant level in the tank.

SUMMARY OF THE INVENTION

An object of this invention is to improve the reliability of the refrigerant level sensor.

Another object of this invention is to eliminate the moving parts.

Still another object of the invention is to eliminate influence of noise generated by the machine parts such as an engine, alternator, etc., on the sensor operation by extending the photoconductive tube from the engine room into the cabin where the operating units of the sensor are provided.

In order to realize these objects, the present invention provides a device for detecting the refrigerant level in a receiver tank where refrigerant condensed into liquid by a condenser is temporarily stored, said device comprising a photoconductor which is so arranged that a part thereof is positioned in said receiver tank, a light source disposed at one end of said photoconductor and a light receptor element adapted to receive the light from said light source and disposed at the other end of said photoconductor, wherein when the photoconductor portion positioned in the receiver tank to pass through the refrigerant in the tank, the light from the light source is diffused into the refrigerant, causing a decreaase of the quantity of light received by said light receptor element, and the refrigerant level in the receiver tank is detected by such a change in the quantity of light passed to said receptor element.

Thus, according to the device of this invention, the quantity of light detected by the receptor element varies according to whether the photoconductor is dipped in the refrigerant or not, so that it is possible to accurately detect the refrigerant level in the tank and thereby said objects of the invention can be attained.

BRIEF DESCRIPTION OF THE DRAWINGS

FIG. 1 is a sectional view of a receiver tank incorporated with the refrigerant level sensor according to this invention detecting an overcharge of refrigerant in the tank.

FIG. 2 is a block diagram of the sensor system according to this invention.

FIG. 3 is a sectional view of a receiver tank equipped with the refrigerant level sensor according to this invention detecting a shortage of refrigerant in the tank.

DETAILED DESCRIPTION OF THE INVENTION

The invention will be described in detail hereinbelow by way of an embodiment thereof with reference to the accompanying drawings.

In FIGS. 1 and 2, it will be seen that a header 1 is mounted atop a receiver tank, said header 1 being provided with a refrigerant inlet 2 and a refrigerant outlet 3, said refrigerant outlet 3 being connected to a suction pipe 4 extending from within the receiver tank.

The receiver tank comprises a bottomed cylindrical body 5 disposed below said header 1. Said body 5 and header 1 are joined by soldering or other means so as to form a refrigerant containing chamber 6. In the inside of the refrigerant containing chamber 6 is provided a layer of desiccant 8 sandwiched between a filter 7 made of felt or other material and a holder member 9 comprisinq a wire gauze or other article. Said desiccant 8 is used to absorb water while said filter 7 is designed to exclude dust and other alien matter.

The refrigerant sensor 11 is provided in said header 1 and its sensing portion is placed in the refrigerant containing chamber 6 defined by the header 1 and the body 5.

The refrigerant sensor 11, as shown in FIG. 2, comprises a U-shaped photoconductor 13 made of optical fiber, acrylic resin fiber or the like, said photoconductor 13 being passed through a threaded portion 12 so that both ends of said photoconductor 13 project out from said threaded portion 12. It will be seen that a light source 14 such as a light emitting diode is provided at one end of said photoconductor 13 and a light receptor element 15 such as a photo-transistor is provided at the other end. The portion of the photoconductor 13 on the receptor element side may, if necessary, extended out through the engine room into the cabin. The light from the light source 14 is received and converted into a voltage by the receptor element 15 and this voltage is judged by a comparator 16. The surplus or shortage of refrigerant in the tank is determined from the change in the quantity of light received by said receptor element 15 and is indicated on a display 17.

The photoconductor 13 has no coating on its external surface and is transparent, and when its external surface is dipped in a liquid refrigerant, a part of the light runs away from the dipped portion and accordingly the quantity of light received by said receptor element 15 decreases. It is thus possible to detect the overcharge of refrigerant in a receiver tank by setting the refrigerant sensor 11 above the tank as in the just described embodiment of the invention. When the refrigerant sensor is set at the bottom of the receiver tank as shown in FIG. 3, it is possible to detect the shortage of refrigerant in the tank. In the latter case, the mode of signal processing is contrary to the above-described embodiment.

As described above, according to the sensor device of this invention, a photoconductor through which light is passed is disposed in a receiver tank and the quantity of light passing through said photoconductor is measured, and the refrigerant level in the tank is detected from the change in the quantity of light that passes through said photoconductor and is received by said receptor element, so that the device of this invention can dispense with moving parts and is capable of accurately detecting the refrigerant level in the receiver tank. Thus, the invention greatly improves the reliability of the refrigerant sensor system.

Further, if the photoconductive tube is extended from the engine room into the cabin where the operating units of the sensor are disposed, it is possible to eliminate the influence of noise produced by the machine parts such as engine, alternator, etc., and to thereby prevent any misoperation due to such noise.

What is claimed is:

1. Apparatus for sensing the level of refrigerant temporarily stored in a receiver tank located in an engine space that is separated from a control space, said apparatus comprising:
    a sensor located in said engine space adjacent said tank and comprising a light source for emitting a light and a photoconductor for receiving said light from said light source, said photoconductor extending at one end from said light source and through said tank in which the refrigerant is temporarily stored, said photoconductor transmitting a portion of said light emitted by said light source that is indicative of the level of refrigerant in the tank; and
    a light receptor means operatively connected to the other end of said photoconductor for receiving said portion of light transmitted by said photoconductor for indicating the level of refrigerant in the tank, said light receptor means being located in said control space separated from said engine space for eliminating the effects of noise that is generated in said engine space on said light receptor means.

2. An apparatus as claimed in claim 1 wherein, said photoconductor is an optical fiber.

3. An apparatus as claimed in claim 1 wherein, said photoconductor is an acrylic resin fiber.

4. An apparatus as claimed in claim 1 wherein, said light source is a light emitting diode.

5. An apparatus as claimed in claim 1 wherein, said light receptor means is comprised of a phototransistor.

6. An apparatus as claimed in claim 1 wherein, said photoconductor is located above the tank.

7. An apparatus as claimed in claim 1 wherein, said photoconductor is located at the bottom of the tank.

8. An apparatus as claimed in claim 1 wherein, said light receptor means located in said control space comprises a light receptor element for generating an electric signal based on said portion of said light transmitted by said photoconductor, a comparator operatively connected to said light receptor element for evaluating the signal generated by said light receptor element, and a display means operatively connected to said comparative for displaying the level of refrigerant in the tank.

* * * * *